Patented Aug. 2, 1949

2,477,760

UNITED STATES PATENT OFFICE 2,477,760

PISTON OIL DRAINER

Edward William Mennie, Windsor, Ontario, Canada

Application November 14, 1947, Serial No. 785,854
In Canada May 16, 1946

2 Claims. (Cl. 309—8)

This invention relates to a piston oil drainer.

The subject of oil control in any reciprocating engine has been given a considerable amount of attention in the past. In present piston construction, particularly when used in internal combustion engines, oil control is usually accomplished by the use of rings having high unit bearing pressures with a system of grooves or slots machined in each ring to allow the passage of oil. The high bearing pressure is supposed to wipe the cylinder surface and conduct the excess oil to vent holes located at the bottom of the oil control ring groove. In actual operation it has been found that the oil may reverse its intended path and actually cause over-lubrication. This condition becomes aggravated as wear increases.

The primary object of the present invention is to provide a piston oil drainer which drains off excess oil from the control ring of a piston to prevent over-lubrication.

Another object of the present invention is to provide a piston oil drainer which may be incorporated in the interior construction of a conventional piston in a simple manner.

A further object of the present invention is to provide a piston oil drainer which is operative by virtue of a single moving flow inducing part.

A still further object of the present invention is to provide a piston oil drainer which allows only a sufficient retention of oil in the control ring to assure adequate lubrication of the piston.

With these and other objects in view, the invention generally comprises an oil receiving bore formed inwardly of the exterior wall of the piston which is placed in communication with the oil control ring groove of the piston, the bore being open, at one end, to communicate with the hollow interior of the piston by way of a check valve, and including therewithin a plunger in such a way as to cause intake of oil from groove to bore as the piston approaches top dead centre, and discharge of the oil to the interior of the piston, for discharge to the sump, as the piston approaches and reaches the opposite end of its stroke.

The invention will be clearly understood by reference to the following detailed specification taken in conjunction with the accompanying drawings which form part of the same.

In the drawings—

Figure 1:
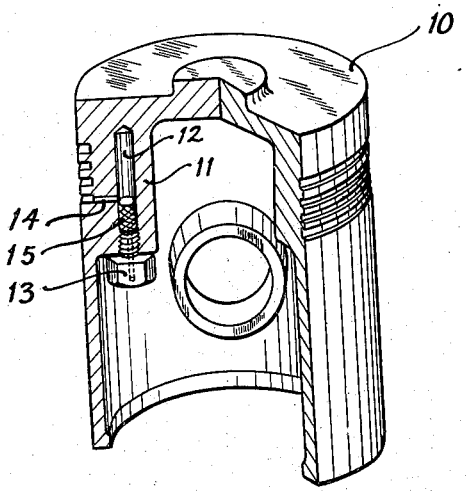
Fig. 1 is a fragmentary perspective view of a conventional piston incorporating the construction of the present invention, the pertinent details of which are revealed in a quarter-cut section of the piston.
Figure 2:
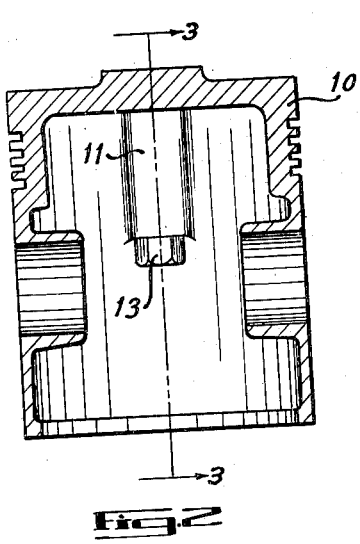
Fig. 2 is a longitudinal sectional view of a piston showing the present invention incorporated therein; and, Fig. 3 is a section taken on the line 3—3 of Fig. 2.
Figure 3:
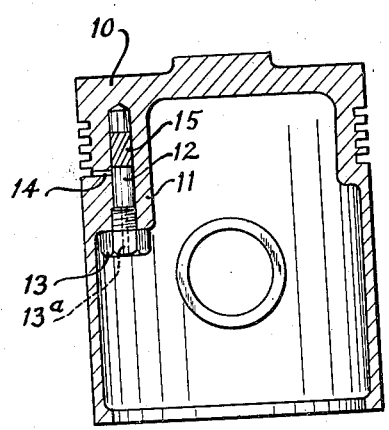

Referring to the drawings, a preferred construction incorporates a piston 10 a boss 11 partially projecting into the hollow interior of the piston from a wall thereof. A bore 12 is machined in the boss 11, parallel with the cylindrical surface of the piston and a check valve 13 is screwed into the counter-bored and threaded end of said bore. The check valve is formed with a small valve controlled passage 13a communicating between the bore 12 and the hollow interior of the piston 10. A port 14 communicates between the control ring groove on the piston and the bore 12, said port being controlled, during operation, by a plunger 15 slidable within said bore.

At the end of each stroke the piston de-acceleration is controlled by the connecting rod (not shown) and since the plunger 15 is not so restrained in its movement, its relative position in the bore 12 is determined substantially by the pressures existing in said bore. When the piston is moving away from the crankshaft (not shown), the plunger 15 is seated against the check valve 13. When the piston slows down as it approaches top dead centre, the inertia of the plunger 15 carries it past the port 14 entrapping vapour in the bore 12, thereby cushioning the thrust of the plunger 15 and preventing excess noise or chatter. Oil is caused to flow, under partial vacuum created in the bore by the displaced plunger 15, from the control ring groove formed in the exterior surface of the piston 10, through the port 14 into the chamber formed in the bore 12 between the base of the plunger 15 and the check valve 13. As the piston reverses its movement, the plunger stays at its upper position until the piston 10 starts to slow down at the crank end of its stroke, at which time the inertia of the plunger 15 carries it past the port 14 closing the latter and forcing the entrapped oil through the check valve 13 to the interior cavity of the piston and hence to the crankcase of the engine.

From the foregoing, it will be obvious that excess oil is readily eliminated from the control piston ring of the cylinder in a simple automatic manner and returned to the sump. The construction, therefore, operates automatically to obviate over-lubrication and to reduce this condition substantially as wear increases.

What I claim as my invention is:

1. In a piston, an oil receiving bore disposed inwardly of and parallel to the exterior wall of the piston and having a port intermediate its ends communicating with a piston ring seating groove in the exterior wall of the piston, said bore being open at one point to communicate with the hollow interior of the piston, a check valve disposed in said latter opening, a plunger in said bore freely slidable between opposite ends of said bore, said plunger being movable to one end of said bore as the piston reaches top dead centre to cause intake of oil from said groove to said bore, said plunger being movable towards the opposite end of said bore to close said port and discharge oil through said valve as said piston substantially reaches the opposite end of its stroke, said discharged oil passing from the hollow interior of the piston to the oil sump of the engine employing said piston.

2. A piston oil drainer comprising a boss formed on the interior wall of the piston, a bore in said boss parallel to the cylindrical surface of said piston and opening at one end into the hollow interior of the piston, a port communicating between the seating groove of a piston ring on said piston and said bore, intermediate the opposite ends of said bore, a check valve disposed in the open end of said bore, a plunger in said bore freely slidable between said valve and the opposite end of said bore, said port being open to the seating groove of said ring and admitting oil vapour therethrough to the upper end of said bore when said plunger is at the valve end of the bore, said plunger being movable to the opposite end of the bore, substantially as the piston reaches top dead centre, to cause suction intake of oil from said groove to said bore, said plunger being movable to the valve end of said bore to close said port and discharge oil through said valve as said piston substantially reaches the opposite end of its stroke, said oil passing from the hollow interior of the piston to the oil sump of the engine employing said piston.

EDWARD WILLIAM MENNIE.

REFERENCES CITED

The following references are of record in the file of this patent:

UNITED STATES PATENTS

| Number | Name | Date |
|---|---|---|
| 1,796,792 | Johnson | Mar. 17, 1931 |
| 2,073,886 | Stifter | Mar. 16, 1937 |